Patented July 4, 1933

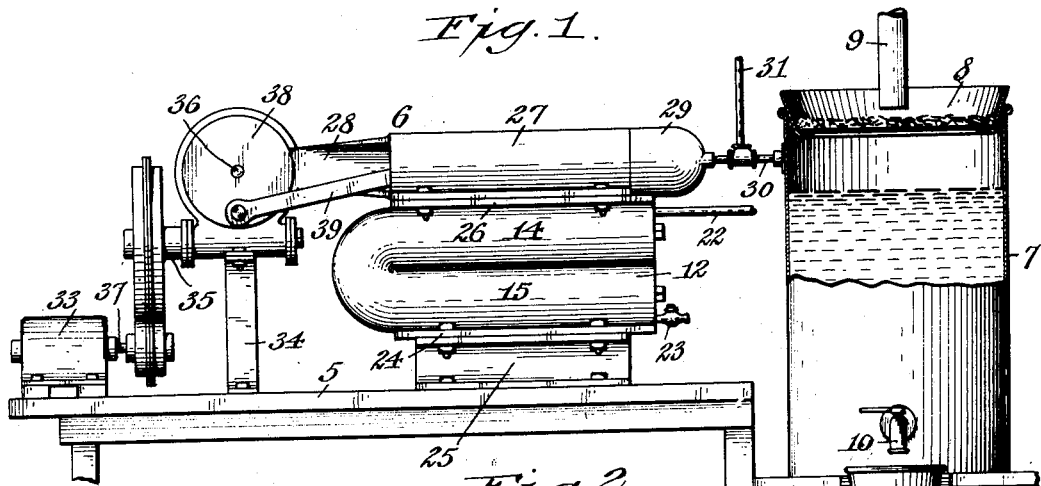

1,916,758

UNITED STATES PATENT OFFICE

FRANK N. GEORGE, OF BUFFALO, NEW YORK

AIR CONTROLLING MECHANISM FOR PAINT-FILTERING APPARATUS

Application filed February 9, 1932. Serial No. 591,794.

This invention relates to improvements in air-controlling mechanism for paint-filtering apparatus and the like, and is in part a continuation of my co-pending application for patent on apparatus for straining paint, Serial No. 380,329, allowed July 17, 1931, issued as Patent No. 1,845,261.

One of the objects of my invention is the provision of air-controlling mechanism, and more particularly air-controlling valve-mechanism whereby the intermittent passage or flow of compressed air is delivered to a paint straining vat or tank, contrariwise to the flow of the paint into the vat or tank.

Another object of my invention is to provide valve-mechanism of simple and improved construction whereby the intermittent flow of compressed air is regulated, and when used in conjunction with a strainer medium in vats or tanks containing paint, will cause sediment or other substances in the paint, larger or heavier than that intended to be passed through the strainer medium, from clogging the openings therein and thus prevent the proper flow of paint into the vat or tank.

Another object of my invention is the provision of air-controlling valve-mechanism associated with and connected to a combined compressed air storage and condenser chamber so as to eliminate the water of condensation from the air prior to its entering the casing of the valve-mechanism.

With the above and other objects in view to appear hereinafter, my invention consists in the novel features of construction and in the arrangement and combination of parts to be hereinafter described and more particularly pointed out in the subjoined claims.

In the drawing:

Fig. 1 is a side elevation of my improved air-controlling mechanism associated with a paint-straining apparatus, said paint-straining apparatus being shown in the form of a filler vat or tank having a portion thereof broken away to illustrate the strainer element therein.

Fig. 2 is a top plan view of the parts illustrated in Fig. 1.

Fig. 3 is an enlarged longitudinal section taken on line 3—3, Fig. 2.

Fig. 4 is a cross section taken on line 4—4, Fig. 3.

Reference being had to the drawing in detail, the numeral 5 designates a table or other support for the air-controlling mechanism 6 and a filling vat or tank 7. The vat or tank is open at its upper end and a strainer pan 8 extends into said upper open end and is retained therein by frictional contact with the peripheral wall of the vat or tank, or otherwise. Paint from a mixing vat (not shown) may be delivered to the filling tank by means of a delivery pipe 9 which extends into the strainer pan and is intended to deliver the paint in proper quantities to said pan, said delivery pipe having a suitable shut-off or control valve (not shown), as will be clearly understood from the drawing in the application of which this is in part a continuation.

The paint delivered into the strainer pan passes through the screen or foraminous bottom of said pan and enters the filler tank, from which the strained paint is discharged through a spigot 10, or other suitable delivery controlling device, into cans, pails, or other containers 11 disposed under the spigot or the like.

It is generally known that paint delivered from mixing vats is not in marketable condition and must be strained before delivering it to the containers in which it is to be sold; and invariably when straining paint delivered from a mixing vat, the capacity of the filler tank is materially reduced, due to the fact that the matter strained out of the paint so clogs the passages in the straining medium that the flow of paint will be stopped. This necessitates the cleaning of the straining medium at frequent intervals to free the passages of the obstructing matter.

To assure a continuous flow of paint and the continuous filling of the cans, pails, and other containers to be marketed, it is necessary to maintain the passages in the screening medium in free and clean condition at all times. With this end in view, I employ air-controlling mechanism whereby a controlled air supply is provided. This mechanism includes an air-controlling valve and means for actuating said valve to provide a governed or regulated flow of compressed air to the filler tank underneath the straining medium, and preferably in association therewith a combined compressed-air storage and condenser chamber.

In preferred construction, the combined compressed-air storage and condenser chamber, designated by the numeral 12, is constructed to provide a U-shaped chamber 13, which chamber is created by two substantially tubular superposed members 14, 15 connected together at one end and open at their other ends. The U-shaped chamber therefore has upper and lower compartments 16, 17 separated by a partition 18 which terminates short of one end of the chamber to form a connecting passage 19 between the two compartments.

The open ends of the tubular members are internally screw-threaded and receive screw-threaded plugs or closures 20, 21, respectively. A compressed air inlet pipe 22 enters the upper compartment 16 through the closure or plug 20 and terminates within said compartment. A drain cock 23 is threaded into the plug or closure 21 of the lower compartment 17.

As clearly shown in Fig. 4, the combined compressed-air storage and condenser chamber has laterally-extending flanges 24 along its lower portion, by means of which it may be secured to a base or bed 25 fastened to the table or support 5, and it also has laterally-extending flanges 26 along its upper portion by means of which the valve casing 27 may be secured thereto. This casing is an elongated cylindrical casing open at opposite ends, and it has at one end thereof a supporting arm 28 extending therefrom, and at its other end it is closed by means of a reducer 29 having an air outlet pipe 30 connected thereto, said air outlet pipe leading to the filler tank 7 and if desired having a branch pipe 31 connected thereto which may be led to other filler tanks. If desired, this air outlet pipe and its branch pipe may have suitable shut-off or control valves (not shown).

Within the cylindrical valve casing 27, my improved control valve 32 is arranged for reciprocable movement, and for the purpose of operating said control valve an electric motor 33 is employed. This motor may be supported in any suitable manner, but is shown in the drawing as fastened to the table or support 5. Also fastened to the table or support 5 is a support 34 by means of which the casing 35 of reduction gear-mechanism is fastened in place. The reduction gear-mechanism, which is contained within the casing 35 may be of any common construction, including a worm, a worm wheel, and one or more gear wheels, or any other suitable mechanism may be used whereby the movement of the motor shaft is transferred to an actuating shaft 36 and the speed at which the latter is rotated be reduced to the desired number of revolutions per minute. The shaft 37 of the motor is shown extending into the reduction gear casing 35, and has one of the gear elements of the reduction gear-mechanism secured thereto. The actuating shaft 36 has another of the gear elements of the reduction gear-mechanism secured thereto, and the last-mentioned shaft is disposed transversely with respect to the valve casing. Said actuating shaft is journaled in both the reduction gear casing 35 and the supporting arm 28, and it has secured thereto a disk 38 to which one end of a connecting rod 39 is eccentrically and pivotally secured, said connecting rod extending into the valve casing 27 and having its other end pivotally connected to the control valve 32. The means employed for reducing the speed of the actuating shaft 36 may be of any suitable type, its purpose being to serve as a medium between the motor 33 and the disk 38 to drive the latter under continuous rotary movement and at a speed considerably reduced from that of the motor shaft.

Admission of compressed air to the valve casing is controlled by the valve 32, which is in the form of a piston valve, compressed air being admitted to the valve casing through registering inlet ports 40, 41 formed, respectively, in the lower portion of the wall of the valve casing and the contiguous portion of the combined compressed-air storage and condenser chamber 12. It may here be stated that the inlet pipe 22 terminates within the upper compartment 16 of said chamber 12 at a point beyond the inlet port 41.

The valve casing 27 has exhaust ports 42, 43 formed therein at opposite sides of a plane extending transversely through said casing and through the registering inlet ports 40, 41. These exhaust ports are therefore disposed along the length of the valve casing for the purpose of discharging the spent, or at least utilized air.

The reciprocating piston valve 32 is bored out or made hollow along a portion of its length, as at 44, and near the inner end of this bore or hollowed-out portion it is provided with inlet and outlet ports 45, 46, respectively; these ports being preferably at diametrically opposite points of the valve. The valve is also provided with packing rings 47, similar to piston rings used on an engine piston, to make the valve air-tight and prevent the escape of compressed air along the same.

For convenience, the combined compressed air storage and condensing chamber will, in places hereinafter, be referred to as a compressed air chamber only, since in my co-pending application above referred to, connection is made to the valve casing 27 from a compressed-air tank through the medium of a connecting pipe.

When the inlet port 45 in the piston valve 32 is in registration with the inlet port 40 of the valve casing and the inlet port 41 in the compression chamber, compressed air is allowed to enter the bore or hollow portion of the piston valve. Since said bore or hollow portion opens directly into the valve casing 27, the air is delivered from said casing through the outlet pipe 30 and led to the filler tank 7. It is, of course, understood that when paint is not being supplied to the filler tank or tanks, as the case may be, the supply of air will be shut off in the outlet pipe 30, and/or its branch pipe 31. As the movement of the piston valve is continuous, although variable in speed during the operation of the motor, the inlet port 45 in said valve, assuming the valve to be traveling to the right or in the direction of the arrow shown in Fig. 3, will pass over the inlet port 40 in the valve casing, and when said inlet port 45 is closed, the air outlet 46 in said piston valve will be moved into registration with the air exhaust port 43 shown at the right in Fig. 3, and thus allow the air within the valve casing, the piston valve, and the outlet pipe 30 leading to the filler tank to escape, thereby causing a reduction of the air pressure within such parts to atmospheric pressure. The valve will be continued in its movement to the right and the air outlet in the valve moved beyond said exhaust port 43 until the piston rod 39 and piston assume the positions shown in dotted lines in Fig. 3, whereupon under continued rotation of the disk 38 the piston rod will cause the piston valve to move to the left without in any manner effecting a change of the air conditions within the valve 32, the valve casing 27, and the outlet pipe 30. Under continued movement of the piston valve to the left, the air inlet 45 is again brought into registration with the inlet ports in the valve casing and compression chambers, at which time air is again admitted to the valve and valve casing and further movement of said valve to the left results in the outlet port 46 of said valve being brought into registration with the exhaust port 42 in the valve casing, when the air is again exhausted. The movement of the piston valve is continued to the left for a considerable distance, and consequently the admission of air into the valve casing is cut off over the major portion of the cycle of movement of the valve within its casing.

Between the time the inlet port 45 of the valve is brought into registration with the inlet port 40 of the valve casing and the time the outlet port 46 of the valve is brought into registration with either of the exhaust ports 42 or 43 of the valve casing, compressed air is confined within the valve 32, valve casing 27, and outlet pipe 30, and can only escape through said outlet pipe into the filler tank underneath the strainer pan. This occurs during comparatively short intervals of time, and during such intervals, the air allowed to enter the filler tank is directed under pressure against the top of the paint contained therein and against the perforated bottom or other straining medium of the strainer pan, with the result that any matter lodged in the perforations or closing the perforations of the straining medium from the top, will be forced upwardly so as to allow free passage of the paint through said straining medium.

Due to the fact that the connecting rod 39 is eccentrically connected to the rotating disk 38, which may, however, be any other eccentric device, such as a crank or the like, conversion of the rotary movement of said disk to reciprocating movement of the piston valve will result in variable movement of said valve, the valve being caused to travel along a greater range of movement while the pivot at the outer end of the connecting rod travels through the upper or lower quarter of its circular path of movement than when traveling through the intermediate or side quarters of the circular path as viewed in Fig. 3, and this quick range of movement, as illustrated in the drawing, preferably occurs between the time that the inlet port 45 in the piston valve is in registration with the inlet port 40 and 41 in the valve casing and compression chamber, respectively, and the time the outlet port 46 of said valve is brought into registration with either of the exhaust ports 42, 43 in said valve casing. Therefore, the charges of compressed air admitted to the piston valve occur over comparatively short periods of time in the cycle of movement of the piston valve, whereas when the air outlet in said valve passes beyond the exhaust ports in said casing, the speed of movement of the piston valve is reduced. Thus the air is admitted underneath the strainer medium in the filler tank at comparatively long intervals, and for very short periods of time. It is, of course, understood that matter that cannot pass through the meshes of the screen, or the perforations or openings in the straining medium lodges upon the latter and tends to prevent, or at least retard, the passage of paint therethrough.

Under present day methods, regardless of the type of straining devices used, the shutting off of the flow of paint from the mixing vats or other source of paint supply is found necessary at short intervals in order to remove the clogging matter from the straining element; either by replacing said element with another that has been cleaned, or by removing the sediment adhering thereto and filling the openings in the same.

With my invention, compressed air is delivered into the filler tank between the level of filtered paint therein and the straining medium, and this air tends to quicken the flow of paint from the filler tanks when in the act of filling cans or other similar vessels and at the same time lift the foreign or clogging matter consisting of pigments, scum, and the like, from the straining medium so as to allow the passage of paint through the same.

When the piston valve 32 is in the position shown in Fig. 3, compressed air is admitted to the valve and valve casing and immediately enters the filler tank through the outlet pipe 30, assuming, of course, that the control valve in said outlet pipe, hereinbefore referred to, is open. Air is admitted to the filler tanks so long as the inlet port 45 admits it to the valve and during the period of time that may exist between the closing of said inlet port and the opening of either of the two exhaust ports 42, 43, in the valve casing by moving the outlet port 46 of said valve into registration or partial registration with such exhaust port. The instant the outlet port 46 of said valve is brought into opening relation with either of the exhaust ports in the casing, compressed air is allowed to escape, and there is no opportunity for the escape of air otherwise, except upwardly through the straining medium in the filler tank, should the air in the valve and valve casing be under slightest compression after closing of either of said exhaust ports. It will therefore be apparent that compressed air is admitted intermittently into the filler tank to free the openings or meshes in the bottom of the screen pan and to lift the undesirable or flow-retarding matter within said pan from the bottom thereof so as to allow the paint to pass freely through said bottom into the filler tank.

It has been found unnecessary in the use of my invention to empty or clean the screen pans except at long intervals.

The combined compressed-air storage and condenser chamber 12 is of a size to store up in it sufficient air under compression to assure a continuous supply of compressed air to the valve mechanism at all times, provided provision is made for furnishing such supply through the air inlet pipe 22. For this purpose an air compressor may be connected directly to said air-inlet pipe. Said air-inlet pipe may, however, be connected to a comparatively large compressed-air tank, which may be connected to a compressor to maintain any desired degree of pressure in said tank, and when so arranged the air inlet pipe will be connected directly to the air inlet port 40 of the valve casing.

By reason of the air inlet pipe 22 being extended beyond the inlet port 41 in the chamber 12, the air is supplied to the U-shaped storage casing in a manner to necessitate the storage of the air in said casing to a predetermined pressure before causing operation of the valve. Any water of condensation accumulating will flow from the upper compartment of said storage chamber to the lower compartment thereof and may be drained from the latter through the drain cock 23.

My invention assures a free and unobstructed flow of paint to the filler tank at all times, and also maximum filling capacity for the apparatus over any given period of time.

Having thus described my invention, what I claim is:

1. The combination with a rotatable shaft, of an air-controlling valve having a cylindrical elongated casing provided with an air-inlet port between its ends, an air-outlet at one end and air-exhaust ports at opposite sides of a plane passing transversely through said air-inlet port, a piston-valve within said casing adapted to travel over said air-inlet port and successively over said air-exhaust ports, and a piston rod operatively connected to said shaft and piston-valve to cause said valve to reciprocate and uncover said air-inlet port when covering said air-exhaust ports.

2. The combination with a rotatable shaft, of an air-controlling valve having a cylindrical elongated casing provided with an air-inlet port between its ends, an air-outlet at one end and air-exhaust ports at opposite sides of a plane passing transversely through said air-inlet port, a piston valve within said casing adapted to travel over said air-inlet port and successively over said air-exhaust ports, and a piston rod operatively connected to said shaft and piston valve to cause said valve to uncover one of said air-exhaust ports when covering said air-inlet port.

3. The combination with a rotatable shaft, of an air-controlling valve having a cylindrical elongated casing provided with an air-inlet port between its ends, an air-outlet at one end and air-exhaust ports at opposite sides of a plane passing transversely through said air-inlet port, a piston valve within said casing adapted to travel over said air-inlet port and successively over said air-exhaust ports, and a piston rod operatively connected to said shaft and piston valve to cause said valve to uncover said air-inlet port and to successively uncover said air-exhaust ports.

4. The combination with a rotatable shaft, of an air-controlling valve having a cylindrical elongated casing provided with an air-inlet port between its ends, an air-outlet at one end and air-exhaust ports at opposite sides of a plane passing transversely through said air-inlet port, a piston valve within said casing adapted to travel over said air-inlet port and successively over said exhaust ports, and a piston rod operatively connected to said shaft and piston valve to cause said valve to uncover said air-inlet port between the times of successively uncovering said air-exhaust ports.

5. The combination with a rotatable element, of an air-controlling valve having a cylindrical elongated casing provided with an air-inlet port between its ends, an air-outlet at one end and air-exhaust ports arranged at opposite sides of a plane passing transversely through said air-inlet port, of a hollow reciprocating valve within said valve casing opening towards said air-outlet and having an air-inlet port adapted to traverse the air-inlet port of said casing and an air-outlet port adapted to traverse the air-exhaust ports of said casing, and a connecting rod eccentrically and pivotally connected at one end to said rotatable element and pivotally connected at its other end to said hollow reciprocating valve.

6. The combination with a rotatable element, of an air-controlling valve having a cylindrical elongated casing open at one end and having a reducer closing its other end, an air-outlet pipe connected to said reducer, a piston valve within said casing, said casing having an air-inlet port adapted to be opened and closed by said piston valve and air-exhaust ports adapted to be successively opened and closed by said piston valve, said air-exhaust ports being successively opened by said valve after opening said air-inlet port, and a connecting rod pivotally connected at one end to said piston valve and extending outwardly from the open end of said casing and having its other end eccentrically connected to said rotatable element.

7. The combination with a rotatable shaft, of a disk mounted on said shaft, a valve casing open at one end and having a reducer closing its other end, said valve casing having an integral arm extending outwardly from its open end in which said shaft is journaled, an air-outlet pipe connected to said reducer, a hollow piston valve within said casing opening toward said air-outlet pipe and having an air-inlet port opening to and an air-outlet port opening from its interior, said air-inlet and outlet ports being disposed at diametrically opposite points of said piston valve, said piston valve having piston rings expanding against the wall of said valve casing and said valve casing having an air-inlet port, and air-exhaust ports spaced along the length thereof, the air-inlet port of said casing being in a plane between said air-exhaust ports so that said piston valve opens the air-inlet port of said casing between the times of opening the air-exhaust ports thereof, and a piston rod having one end eccentrically connected to said shaft and its other end pivotally connected to said piston valve.

In testimony whereof, I affix my signature.

FRANK N. GEORGE.